(12) United States Patent
Register et al.

(10) Patent No.: US 11,884,833 B2
(45) Date of Patent: Jan. 30, 2024

(54) DAMAGE-TOLERANT COATING

(71) Applicant: SWIMC LLC, Cleveland, OH (US)

(72) Inventors: James A. Register, Garland, TX (US); Dawn Michelle Lieu, Lakeville, MN (US); Gregory B. Hayes, Apple Valley, MN (US); Jade Muns, Garland, TX (US)

(73) Assignee: SWIMC LLC, Cleveland, OH (US)

( * ) Notice: Subject to any disclaimer, the term of this patent is extended or adjusted under 35 U.S.C. 154(b) by 0 days.

(21) Appl. No.: 17/662,108

(22) Filed: May 5, 2022

(65) Prior Publication Data

US 2022/0259452 A1  Aug. 18, 2022

Related U.S. Application Data

(63) Continuation of application No. 16/070,717, filed as application No. PCT/US2017/014942 on Jan. 25, 2017, now abandoned.

(60) Provisional application No. 62/287,059, filed on Jan. 26, 2016.

(51) Int. Cl.
| | |
|---|---|
| *C09D 127/16* | (2006.01) |
| *C09D 7/40* | (2018.01) |
| *C09D 7/61* | (2018.01) |
| *C09D 5/00* | (2006.01) |
| *C08K 3/36* | (2006.01) |
| *C08L 27/18* | (2006.01) |
| *B05D 7/14* | (2006.01) |
| *B05D 5/08* | (2006.01) |

(52) U.S. Cl.
CPC ............ *C09D 127/16* (2013.01); *B05D 7/14* (2013.01); *C09D 5/00* (2013.01); *C09D 7/40* (2018.01); *C09D 7/61* (2018.01); *C09D 7/69* (2018.01); *B05D 5/083* (2013.01); *B05D 2601/00* (2013.01); *B05D 2602/00* (2013.01); *C08K 3/36* (2013.01); *C08K 2201/005* (2013.01); *C08L 27/18* (2013.01)

(58) Field of Classification Search
CPC .......... C09D 127/16; C09D 7/69; C09D 5/00; C09D 7/40; C09D 7/63; C09D 7/61; B05D 7/14; B05D 2602/00; B05D 5/083; B05D 2601/00; C08L 27/18; C08K 2201/005; C08K 3/36
See application file for complete search history.

(56) References Cited

U.S. PATENT DOCUMENTS

| | | | |
|---|---|---|---|
| 6,017,639 A | 1/2000 | Higginbotham et al. | |
| 8,975,311 B2 | 3/2015 | Mirante et al. | |
| 2010/0062200 A1* | 3/2010 | Domes .................... | B05D 3/02 428/35.8 |

FOREIGN PATENT DOCUMENTS

| | | | | |
|---|---|---|---|---|
| CN | 101402814 A | 4/2009 | | |
| EP | 1440131 B1 | 9/2007 | | |
| EP | 1921051 A1 * | 5/2008 | ............. | C04B 26/32 |
| EP | 1921051 A1 | 5/2008 | | |
| JP | 2001-037775 A2 | 5/2001 | | |
| JP | 2012-184141 A2 | 9/2012 | | |
| JP | 5730620 B2 | 6/2015 | | |
| WO | 2015183362 | 12/2015 | | |
| WO | WO-2015183362 A1 * | 12/2015 | ........... | C09D 127/12 |
| WO | WO-2016149238 A1 * | 9/2016 | ............ | C08F 114/22 |
| WO | 2016183272 | 11/2016 | | |
| WO | 2018011288 | 1/2018 | | |
| WO | 2015111429 | 7/2018 | | |

OTHER PUBLICATIONS

Lubrizol Applications Guide: Surface Modifiers for Coatings. 2011. 12 pages. (Year: 2011).*
International Search Report for application No. PCT/US2017/014942, dated Apr. 25, 2017 (2 pages).
Written Opinion for application No. PCT/US2017/014942, dated Apr. 25, 2017 (6 pages).
Lubrizol Applications Guide: Surface Modifiers for Coatings, dated 2011 (12 pages).
Technical Data Sheet: Portafill Functional Fillers and Extenders, dated 2015 (2 pages).
Waddell, W.H. and Evans, L.R., Silica, Amorphous Silica, in Kirk-Othmer Encyclopedia of Chemical Technology, dated 2000 (25 pages).
Crystalline Sllica: The Science, found online at https://safesilica.eu/crystalline-silica-the-science/, accessed on Dec. 31, 2021 (5 pages).
Colloidal Silica Facts: What is Silica? found online at https://www.nouryon.com/products/colloidal-silica/what-is-silica/, accessed Dec. 31, 2021 (11 pages).
Extended European Search Report for European patent appl. No. 17744840.4, dated Jul. 29, 2019 (8 pages).
First Office Action issued for corresponding European patent application No. 17744840.4, dated Jul. 14, 2020 (4 pages).
Second Office Action issued for corresponding European patent application No. 17744840.4, dated May 31, 2021 (6 pages).
Third Office Action issued for corresponding European patent application No. 17744840.4, dated Feb. 16, 2022 (6 pages).
First Office Action issued for corresponding Chinese patent application No. 201780007604.0, dated Mar. 26, 2020 (12 pages, including English translation).
Second Office Action issued for corresponding Chinese patent application No. 201780007604.0, dated Feb. 8, 2021 (13 pages, including English translation).

(Continued)

*Primary Examiner* — William P Fletcher, III

(57) ABSTRACT

The present invention provides a coating composition having excellent damage tolerance. The coating composition includes a binder system comprising at least a fluoropolymer, optionally, one or more other resin components, a crosslinking component and at least one inorganic filler and organic filler. Coated articles with the coating composition applied to at least a portion of a surface thereof are also provided.

7 Claims, 1 Drawing Sheet

(56) References Cited

OTHER PUBLICATIONS

Third Office Action issued for corresponding Chinese patent application No. 201780007604.0, dated Jul. 14, 2021 (10 pages, including English translation).
Fourth Office Action issued for corresponding Chinese patent application No. 201780007604.0, dated Feb. 10, 2022 (8 pages, including English translation).

* cited by examiner

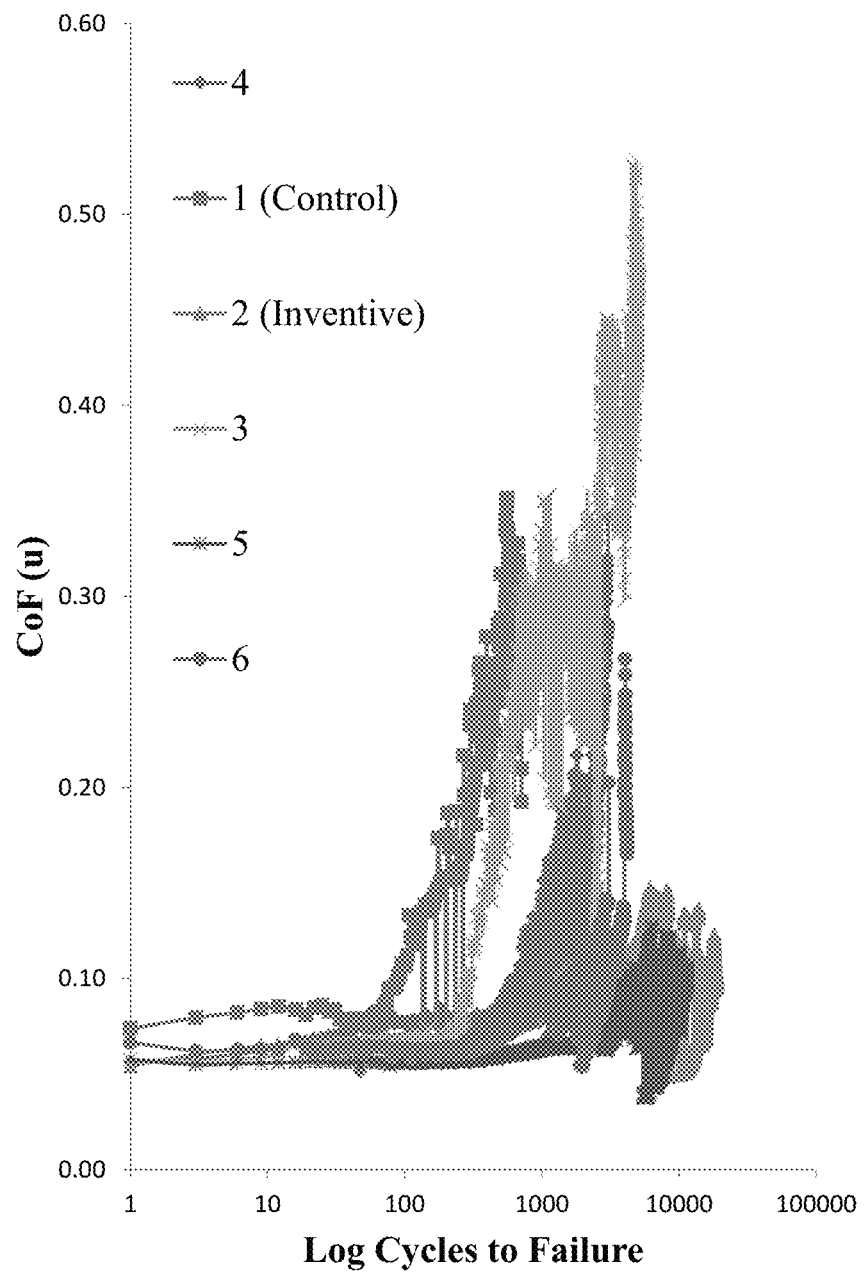

DAMAGE-TOLERANT COATING

CROSS-REFERENCE TO RELATED APPLICATION(S)

This application is a continuation of U.S. patent application Ser. No. 16/070,717, filed Jul. 17, 2018, now abandoned, which is a national stage application of PCT/US2017/014942, filed Jan. 25, 2017, which claims benefit from U.S. provisional application No. 62/287,059 filed Jan. 26, 2016 and entitled "Damage-Tolerant Coating," which is incorporated herein by reference in its entirety.

BACKGROUND

Polymer coating compositions are routinely applied to substrates, especially metal substrates. Such coatings are used for a variety of reasons, including, for example, to protect the substrate from degradation, to beautify the substrate (e.g., to provide color, brightness, etc.), and the like.

Many such polymer coating compositions are applied on planar substrates (e.g., using coil coating processes) that are subsequently formed into finished articles, including articles used as exterior building materials, for light fixtures, and the like. The coating must also maintain a suitable aesthetic appearance (color, smoothness, gloss, and the like) over the various processes involved in bringing a coil-coated product to the consumer, including forming, shipping, handling, and installation.

Coil-coated parts, including coatings made with fluoropolymers, are easily damaged during handling and installation. To reduce such damage, manufacturers often place a laminate protecting sheet on coil-coated panels prior to shipping. However, this adds labor and materials costs to the process. Other conventional methods of preventing damage include adding filler material to the coating composition, but this produces a visibly significant textured appearance and a displeasing tactile feature that is not desired or acceptable for many coil coating applications, including coil coated panels used for building materials or architectural surfaces.

Accordingly, there is a continuing need for coil coatings and coil coated parts that demonstrate excellent damage tolerance with optimal smoothness and desirable tactile feel.

SUMMARY

In one embodiment, the present description provides a coated article including a substrate with a cured coating disposed thereon. The cured coating is derived from a coating composition including a resin component including at least one fluoropolymer, an organic filler material with particle size no more than 15 μm, and an inorganic filler material with particle size no more than 15 μm. The coating has a smooth appearance and demonstrates increased damage tolerance relative to a coating derived from a conventional coating composition.

In another embodiment, the present description provides a coating composition from which a coating disposed on at least of a portion of surface of a metal substrate is derived. The coating has increased damage tolerance relative to a coating derived from a conventional coating.

In yet another embodiment, the present description provides a method of producing a coated article from a metal substrate, wherein the substrate has, disposed on at least a portion of its surface, a cured coating formed from the coating composition described herein.

Definitions

Unless otherwise specified, the following terms as used herein have the meanings provided below.

The term "crosslinker" refers to a molecule capable of forming a covalent linkage between polymers or between two different regions of the same polymer. The term "curing agent" is used interchangeably with the term "crosslinker" herein.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (i.e., polymers of two or more different monomers). Similarly, unless otherwise indicated, the use of a term designating a polymer class such as, for example, "polyester" is intended to include both homopolymers and copolymers (e.g., polyester-urethane polymers).

The term "comprises" and variations thereof do not have a limiting meaning where these terms appear in the description and claims.

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, "a," "an," "the," "at least one," and "one or more" are used interchangeably. Thus, for example, a coating composition that comprises "an" additive can be interpreted to mean that the coating composition includes "one or more" additives.

Also herein, the recitations of numerical ranges by endpoints include all numbers subsumed within that range (e.g., 1 to 5 includes 1, 1.5, 2, 2.75, 3, 3.80, 4, 5, etc.). Furthermore, disclosure of a range includes disclosure of all subranges included within the broader range (e.g., 1 to 5 discloses 1 to 4, 1.5 to 4.5, 1 to 2, etc.).

BRIEF DESCRIPTION OF THE DRAWINGS

FIG. 1 is a graphical representation of damage tolerance.

DETAILED DESCRIPTION

In one embodiment, the present description provides a cured coating formed from a thermosetting coating composition that exhibits excellent damage tolerance. The coating composition typically comprises a binder resin, an organic filler component, and an inorganic filler component. The binder system preferably includes at least a first resin component, and optionally, one or more additional resin components. Preferably, the coating composition includes at least a film-forming amount of the binder system. Although coating compositions including a liquid carrier are presently preferred, it is contemplated that the composition described herein may have utility in other coating application techniques such as, for example, powder coating, extrusion, or lamination.

The binder system described herein includes at least a first resin component. The first resin component is preferably a halogenated polymer, more preferably a fluoropolymer. As used herein, the term "fluoropolymer" means a polymer or copolymer containing at least 50 mole percent fluoromonomer units. Suitable fluoromonomer units include, for example, vinylidene fluoride, vinyl fluoride, trifluoroethylene, chlorotrifluoroethylene (CTFE), tetrafluoroethylene (TFE), hexafluoropropylene (HFP), and the like.

In an aspect, the fluoropolymer of the composition described herein is poly(vinylidene fluoride) or PVDF, a homopolymer wherein at least 50 wt %, preferably 70 wt %, more preferably 90 wt % of fluoromonomer units are vinylidene fluoride.

In certain embodiments, the fluoropolymer described herein may be an acrylic-modified PVDF composition, i.e. PVDF modified with a thermoplastic acrylic polymer, i.e. a copolymer of one more lower alkyl (C1-C6 alkyl) methacrylate esters and/or one or more lower alkyl acrylate esters. In an aspect, the acrylic-modified PVDF described herein preferably includes at least about 70%, more preferably 85 wt % PVDF and at least 5 wt % of the acrylic polymer. More preferably, the acrylic-modified PVDF includes about 85 to 95 wt % PVDF and about 5 to 15 wt % of the thermoplastic acrylic polymer.

The fluoropolymers described herein preferably include PVDF having weight average molecular weight (Mw) of about 150,000 to 500,000, more preferably 350,000 to 450,000. The ratio of weight average molecular weight to number average molecular weight (Mw/Mn) is at least about 3.5, preferably about 3.5 to 50.0, and the fluoropolymer has a melting point of preferably about 120° to 200° C., more preferably 150° to 170° C. Suitable fluoropolymers are commercially available, and include, for example, the KYNAR line of polyvinylidene difluoride products (Arkema, Philadelphia PA).

In an embodiment, the binder system may optionally include one or more other resin components in addition to the first resin component. These resin components may be identical to the first resin component, or distinct from the first resin component. Suitable other resins include, for example, acrylic polymers or copolymers, polyesters, epoxies, silicone-modified polyesters, polyurethanes, and the like, and mixtures and combinations thereof.

The amount of the binder component in the coating composition described herein is preferably about 1 to 65 wt %, more preferably about 15 to 50 wt %, and most preferably about 20 to 40 wt %, based on the total weight of the coating composition. The amount of binder used in the composition will vary depending on the resin component(s) selected, and on desired end uses for the coating.

In an embodiment, the coating composition further includes a crosslinker or curing agent. The crosslinker may be used to facilitate cure of the coating and to build desired physical properties. When present, the amount of crosslinker will vary depending upon a variety of factors, including, e.g., the intended end use and the type of crosslinker. Typically, one or more crosslinkers will be present in the coating composition in an amount greater than about 0.01 wt-%, more preferably from about 5 wt % to about 50 wt %, even more preferably from about 10 wt % to about 30 wt %, and most from about 15 wt % to about 20 wt %, based on total weight of resin solids.

Polymers having hydroxyl groups are curable through the hydroxyl groups. Suitable hydroxyl-reactive crosslinking agents may include, for example, aminoplasts, which are typically oligomers that are the reaction products of aldehydes, particularly formaldehyde; amino- or amido-group-carrying substances exemplified by melamine, urea, dicyandiamide, benzoguanamine and glycoluril; blocked isocyanates, or a combination thereof.

Suitable curing agents also include aminoplasts, which are modified with alkanols having from one to four carbon atoms. It is suitable in many instances to employ precursors of aminoplasts such as hexamethylol melamine, dimethylol urea, hexamethoxymethyl melamine, and the etherified forms of the others. Thus, a wide variety of commercially available aminoplasts and their precursors can be used. Suitable commercial amino crosslinking agents include those sold by Cytek under the tradename CYMEL (e.g., CYMEL 301, CYMEL 303, and CYMEL 385 alkylated melamine-formaldehyde resins, or mixtures of such resins, are useful) or by Solutia under the tradename RESIMENE.

Suitable crosslinkers may also include blocked isocyanates, such as, for example, as described in U.S. Pat. No. 5,246,557. Blocked isocyanates are isocyanates in which the isocyanate groups have reacted with a protecting or blocking agent to form a derivative that will dissociate on heating to remove the protecting or blocking agent and release the reactive isocyanate group. Some examples of suitable blocking agents for polyisocyanates include aliphatic, cycloaliphatic or aralkyl monohydric alcohols, hydroxylamines and ketoximes. Presently preferred blocked polyisocyanates dissociate at temperatures of around 160° C. The presence of a catalyst is preferred to increase the rate of reaction between the liberated polyisocyanate and the active hydrogen-containing compound (e.g., a hydroxyl-functional polyester). The catalyst can be any suitable catalyst such as, for example, dibutyl tin dilaurate or triethylene diamine.

Suitable crosslinkers also include unblocked isocyanates. Unblocked isocyanates are difunctional or polyfunctional isocyanates with free isocyanate groups attached to aliphatic, cycloaliphatic, aryl, araliphatic and/or aromatic moieties. Examples include, without limitation, tetramethylene diisocyanate, hexamethylene diisocyanate, dodecamethylene diisocyanate, 1,4-diisocyanatocyclohexane, 3,5,5-trimethylcyclohexyl isocyanate, isophorone diisocyanate, and the like.

In some embodiments, an ultraviolet curing crosslinker or an electron-beam curing crosslinker may be suitable. Examples of suitable such crosslinkers may include 1,6-hexanediol diacrylate, 1,4-butanediol diacrylate, trimethylolpropane triacrylate, or mixtures thereof.

The coating composition described herein may be produced by conventional methods known to those of skill in the art. In an embodiment, the coating composition is prepared by use of a polymerization or processing aid, such as a catalyst, for example. Suitable processing aids include, without limitation, metal catalysts (e.g., stannous oxalate, stannous chloride, butylstannoic acid, dibutyl tin oxide, tetrabutyltitanate, or tetra butylzirconate), antioxidants (e.g., hydroquinone, monotertiarybutyl-hydroquinone, benzoquinone, 1,4-napthoquinone,2,5-diphenyl-p-benzoquinone, or p-tert butylpyrocatechol), unblocked and blocked acid catalysts (e.g., dinonylnaphthalene sulfonic acid, dinonylnaphthalene disulfonic acid, dodecyl benzene sulfonic acid, p-toluene sulfonic acid, phosphate esters, and mixtures or combinations thereof), and mixtures thereof. The amount of catalyst depends on the amount and nature of the reactants, but is up to about 5 wt %, preferably up to about 2 wt %, based on the total weight of resin solids.

Other additives known in the art may be included in the coating composition described herein. These additives include, without limitation, flatting agents, fillers, flow or viscosity modifiers, texture-providing additives, waxes and/or other binders that may be included or dispersed in the coating composition. These additives are typically included in the coating composition to provide or enhance particular properties of the cured coating formed from the composition.

In an embodiment, the coating described herein demonstrates excellent damage tolerance when used as a coil coating, for example. Conventionally, coil coatings made from fluoropolymers like PVDF, for example, are easily damaged during shipping, handling and installation. It is common practice in the industry to provide a protective laminate sheet on coated articles or panels prior to shipment. However, this adds time, labor and significant material costs to the process of transport and shipment of coated panels or articles.

One solution to the problem of coating damage during shipping, handling and installation has been to include filler particles, such as polytetrafluoroethylene (PTFE) particles, in the composition. However, the PTFE particles tend to produce a significantly textured or rough appearance, and in some applications such as standing wall building panels, for example, the inclusion of PTFE in the composition provides a coating with a displeasing or undesirable tactile feel.

Surprisingly, the composition described herein provides a cured coating that demonstrates excellent damage resistance while maintaining a smooth surface and an appealing or desirable tactile feel. The cured coating demonstrates increased damage tolerance relative to coatings derived from conventional coating compositions, including conventional coil coating compositions, for example. Without limiting to theory, the excellent damage resistance is believed to be the result of filler particles that reduce friction between coating layers on adjacent coated sheets or articles in a way that minimizes damage.

In an embodiment, the coating composition described herein includes at least one organic filler and at least one inorganic filler. Suitable organic fillers include, without limitation, polymeric fillers, waxes, viscosity modifiers, and the like, and mixtures or combinations thereof. In a preferred aspect, the organic filler is a polymeric filler. Examples of suitable polymeric fillers include, without limitation, polyvinyl acetate, vinyl acetate copolymers, polystyrene, polyethylene, polytetrafluoroethylene (PTFE), polypropylene, polybutylene, polybutadiene, copolymers of butadiene and styrene, polyacrylonitrile, polyacrylate esters, silyl-modified polymethacrylate esters, and the like, and mixtures or combinations thereof. In some embodiments, the organic filler may be a high melting, high molecular weight polyolefin material. In a preferred aspect, the polymer filler material is PTFE.

The polymeric filler described herein has particle size ($D_{50}$) of preferably 1 to 20 µm, more preferably 5 to 15 µm, and most preferably 7 to 12 µm. In an aspect, the particle size is no less than about 5 µm, preferably no less than about 7 µm, and no more than about 15 µm, preferably no more than about 12 µm.

In an embodiment, the coating composition described herein includes polymeric filler material in an amount of preferably 0.1 to 10 parts per hundred (phr), more preferably 0.5 to 7 phr of the finished film weight of the coating.

In an embodiment, the coating composition described herein includes at least one organic filler and at least one inorganic filler. Suitable inorganic fillers include, for example, pigment particles, mineral fillers, metallic materials, and the like. The inorganic filler is preferably a mineral filler, more preferably an untreated amorphous mineral filler. Examples of suitable mineral fillers include, without limitation, kaolin, talc, silica, mica, wollastonite, alumino-silicate material, and the like, and mixtures or combinations thereof. In a preferred aspect, the mineral filler is untreated amorphous silica.

The inorganic filler material described herein has ($D_{50}$) particle size of about 1 to 20 µm, preferably 5 to 15 µm, more preferably 10 to 14 µm. In an aspect, the particle size is no less than about 5 µm, preferably no less than about 10 µm, and no more than about 15 µm, preferably no more than about 14 µm.

In a preferred aspect, the coating composition described herein includes inorganic filler material in an amount of up to about 15 wt %, preferably about 1.5 to 10 wt %, based on the total weight of resin solids in the composition.

The total amount of solids present in the coating composition described herein may vary depending upon a variety of factors including, for example, the desired method of application. For coil coating applications, the coating composition will typically include from about 30 to about 65 wt % of solids. In some embodiments, the coating composition may include as much as 80 wt % or more of solids.

Preferred cured coating compositions of the invention have excellent adhesion, hardness, flexibility, and demonstrate high tolerance to damage, especially during shipping, handling and installation. The combined properties of a smooth appearance and a damage-tolerant surface provide a significant advantage over existing thermoplastic coatings, especially coil coatings.

The coating composition described herein may be applied by a variety of methods known to those of skill in the art. In an embodiment, the composition is applied to planar metal surfaces using a coil coating process. The coating is preferably applied as a thin film, with thickness in the range of preferably 0.1 to 5 mil, more preferably 0.5 to 2 mil, and even more preferably about 1 to 1.2 mil.

The coating composition has utility in a multitude of applications. The coating composition of the invention may be applied, for example, as an intermediate coat, as a topcoat, or any combination thereof. The coating composition may be applied to sheet metal such as is used for external building wall panels, interior wall panels, architectural metal skins (e.g., gutter stock, window blinds, siding and window frames, etc.) and the like, by spraying, dipping, or brushing, but is particularly suited for a coil coating operation where the composition is applied onto the sheet as it unwinds from a coil and then baked as the sheet travels toward an uptake coil winder. It is further contemplated that the coating composition of the invention may have utility in a variety of other end uses, including, industrial coating applications such as, e.g., appliance coatings; packaging coating applications; interior or exterior steel building products; HVAC applications; agricultural metal products; wood coatings; etc. In a preferred aspect, the cured coating described herein is used as an exterior coating for building materials, architectural skins and the like.

Non-limiting examples of metal substrates that may benefit from having a coating composition of the invention applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel).

The coating is typically cured or hardened in a heated temperature environment of from about 200 to 500° C., more preferably from about 270 to 470° C. For coil coating operations, the coating is typically baked for 8 to 25 seconds, to a peak metal temperature (PMT) of from about 200 to 250° C.

EXAMPLES

The present invention is illustrated by the following examples. It is to be understood that the particular examples, materials, amounts, and procedures are to be interpreted broadly in accordance with the scope and spirit of the invention as set forth herein. Unless otherwise indicated, all parts and percentages are by weight and all molecular weights are weight average molecular weight. Unless otherwise specified, all chemicals used are commercially available from, for example, Sigma-Aldrich, St. Louis, Missouri.

Example 1: Preparation of Coating Compositions

Coating compositions (#1 through #6) as shown in Table 1 were prepared by combining a binder system including PVDF and a curing agent. The binder and curing agent were blended together using standard mixing techniques known in the art, along with different filler materials as shown in Table 1. The coating compositions were applied to metal panels using standard application methods, and baked at peak metal temperatures of about 200° to 250° C. to provide coated test panels. The panels were tested for damage tolerance by measuring the number of cycles during a linear reciprocator test where the pressure applied to the coating was similar to the pressure used during typical forming operations. Results are shown in FIG. 1, where the highest damage tolerance corresponds to the maximum cycles of failure at a low coefficient of friction.

TABLE 1

Coating Compositions

| Coating | Organic filler | Inorganic filler (>15 μm) | Inorganic filler (<15 μm) |
|---|---|---|---|
| 1 (control) | − | + | − |
| 2 (inventive) | + | − | + |
| 3 | − | − | + |
| 4 | + | + | − |
| 5 | + | − | − |
| 6 | + | − | − |

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A coil-coated article, comprising
   a substrate;
   a coating disposed thereon at a film thickness of 0.5 to 1 mil and cured by baking for 8 to 25 seconds to a peak metal temperature (PMT) of about 200 to 250° C., the coating derived from a composition comprising:
      a binder system including a first resin component comprising at least a fluoropolymer;
      an organic filler material comprising polytetrafluoroethylene (PTFE) having a $D_{50}$ particle size of about 7 to 12 μm;
      about 1.5 to 10 wt %, based on the total weight of the composition, of an inorganic filler material comprising untreated amorphous silica and having a $D_{50}$ particle size of about 5 to 15 μm; and
      a liquid carrier,
   wherein the coated article demonstrates damage tolerance of at least about 10,000 cycles at a coefficient of friction (μ) of no more than about 0.15.

2. The coated article of claim 1, wherein the fluoropolymer comprises about 50 to 70% by weight of the resin component, based on the total weight of the composition.

3. The coated article of claim 1, wherein the fluoropolymer comprises up to about 70% by weight polyvinylidene difluoride (PVDF).

4. The coated article of claim 1, wherein the resin component further comprises a polymer derived from one or more ethylenically unsaturated monomers.

5. The article of claim 1, wherein the coating comprises 0.5 to 7 phr of the organic filler of finished film weight.

6. The article of claim 1, wherein the inorganic filler material has particle size of about 10 to 14 μm.

7. The article of claim 1, further comprising at least one colored pigment.

* * * * *